(12) United States Patent
Ma et al.

(10) Patent No.: US 8,329,814 B2
(45) Date of Patent: Dec. 11, 2012

(54) INK FORMULATIONS, MODIFIED PIGMENT-BASED INK FORMULATIONS AND METHODS OF MAKING

(75) Inventors: Zeying Ma, San Diego, CA (US); Gregg A. Lane, San Diego, CA (US); Yuan Yu, Westford, MA (US); Xiaohe Chen, San Diego, CA (US); George M. Sarkisian, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 291 days.

(21) Appl. No.: 12/728,976

(22) Filed: Mar. 22, 2010

(65) Prior Publication Data

US 2010/0179278 A1    Jul. 15, 2010

Related U.S. Application Data

(62) Division of application No. 12/483,185, filed on Jun. 11, 2009, now Pat. No. 7,728,062, which is a division of application No. 11/240,431, filed on Sep. 30, 2005, now Pat. No. 7,563,842.

(60) Provisional application No. 60/621,501, filed on Oct. 22, 2004.

(51) Int. Cl.
*C09D 11/10* (2006.01)
*C08K 9/00* (2006.01)
*C08L 31/02* (2006.01)
*C08F 8/00* (2006.01)

(52) U.S. Cl. ........ 524/562; 524/517; 524/522; 524/523; 524/547; 524/548; 524/549; 524/555; 524/558; 524/566; 524/568; 524/571; 524/576; 528/499; 106/31.85; 106/476; 106/493; 347/100

(58) Field of Classification Search .................. 523/160; 524/577, 517, 522, 523, 547, 548, 549, 555, 524/558, 562, 566, 568, 571, 576; 106/31.85, 106/476, 493; 347/100; 528/499
See application file for complete search history.

(56) References Cited

U.S. PATENT DOCUMENTS

| | | | |
|---|---|---|---|
| 6,406,143 B1 | 6/2002 | Chen et al. | |
| 6,423,785 B1 | 7/2002 | Esselborn et al. | |
| 6,494,943 B1 | 12/2002 | Yu et al. | |
| 6,620,879 B1 | 9/2003 | Albrecht et al. | |
| 6,641,656 B2 | 11/2003 | Yu et al. | |
| 6,723,783 B2 | 4/2004 | Palumbo et al. | |
| 7,563,842 B2 | 7/2009 | Ma et al. | |
| 7,605,192 B2 * | 10/2009 | Sanada et al. | 523/160 |
| 2002/0005146 A1 | 1/2002 | Palumbo et al. | |
| 2003/0217672 A1 | 11/2003 | Palumbo | |
| 2004/0007152 A1 | 1/2004 | Palumbo | |
| 2009/0247687 A1 | 10/2009 | Ma et al. | |

\* cited by examiner

*Primary Examiner* — Fred M Teskin (57) ABSTRACT

Briefly described, embodiments of this disclosure include ink formulation and modified pigments. One exemplary modified pigment, among others, includes a pigment A represented by the formula in FIG. 3.

10 Claims, 7 Drawing Sheets

INK FORMULATIONS, MODIFIED PIGMENT-BASED INK FORMULATIONS AND METHODS OF MAKING

CROSS-REFERENCE TO RELATED APPLICATION

This application is a divisional of U.S. application Ser. No. 12/483,185, filed on Jun. 11, 2009, now U.S. Pat. No. 7,728,062, which in turn is a divisional of U.S. application Ser. No. 11/240,431, filed on Sep. 30, 2005, now U.S. Pat. No. 7,563,842, which claims priority to U.S. provisional application Ser. No. 60/621,501, filed on Oct. 22, 2004.

BACKGROUND

The use of inkjet printing systems in offices and homes has grown dramatically in recent years. The growth can be attributed to drastic reductions in cost of inkjet printers and substantial improvements in print resolution and overall print quality. While the print quality has drastically improved, research and development efforts continue toward improving the permanence of inkjet images because this property still falls short of the permanence produced by other printing and photographic techniques. A continued demand in inkjet printing has resulted in the need to produce images of high quality, high permanence, and high durability, while maintaining a reasonable cost.

In inkjet printing, the inkjet image is formed on a print medium when a precise pattern of dots is ejected from a drop-generating device known as a printhead. The typical inkjet printhead has an array of precisely formed nozzles located on a nozzle plate and attached to an inkjet printhead array. The nozzles are typically 30 to 40 micrometers in diameter. The inkjet printhead array incorporates an array of firing chambers that receive liquid ink, which includes pigment-based inks and/or dye-based inks dissolved or dispersed in a liquid vehicle, through fluid communication with one or more ink reservoirs. Each chamber has a thin-film resistor, known as a firing resistor, located opposite the nozzle so ink can collect between the firing resistor and the nozzle. Upon energizing of a particular firing resistor, a droplet of ink is expelled through the nozzle toward the print medium to produce the image. The printhead is held and protected by an outer packaging referred to as a print cartridge or an inkjet pen.

However, there is still a need for pigment-based ink having stability, low viscosity, and compatibility with multiple solvents and paper types, as well as being able to produce images of high gloss, uniform area fill, and good black/color mixing, while maintaining a reasonable cost.

SUMMARY

Briefly described, embodiments of this disclosure include ink formulations. One exemplary ink formulation, among others, includes an aqueous vehicle; a pigment dispersed throughout the aqueous vehicle, the pigment having polymeric binders attached thereto; and at least one unattached polymeric binder dispersed throughout the aqueous vehicle; wherein the polymeric binders attached to the pigment are chemically similar to the at least one unattached polymeric binder.

Figure 3:
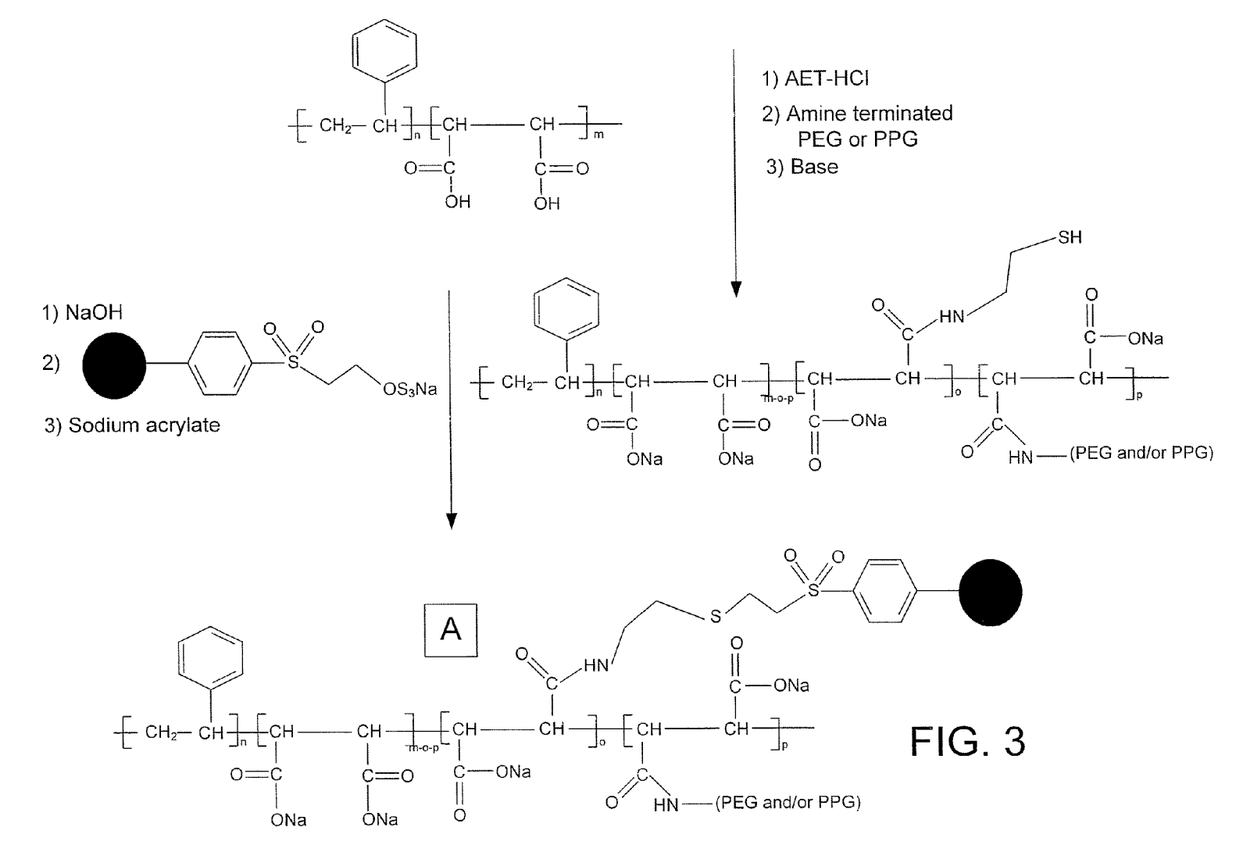
FIG. 3 illustrates an embodiment of a representative reaction mechanism to produce a modified pigment A.

One exemplary ink composition, among others, includes a pigment A represented by the formula in FIG. 3, wherein a ratio of n to m is about 1.1 to about 4:1, wherein o and p can each be about 5 to 100% of the value of m, wherein PEG is polyethylene glycol and PPG is polypropylene glycol, and wherein ● is a pigment.

Figure 4:
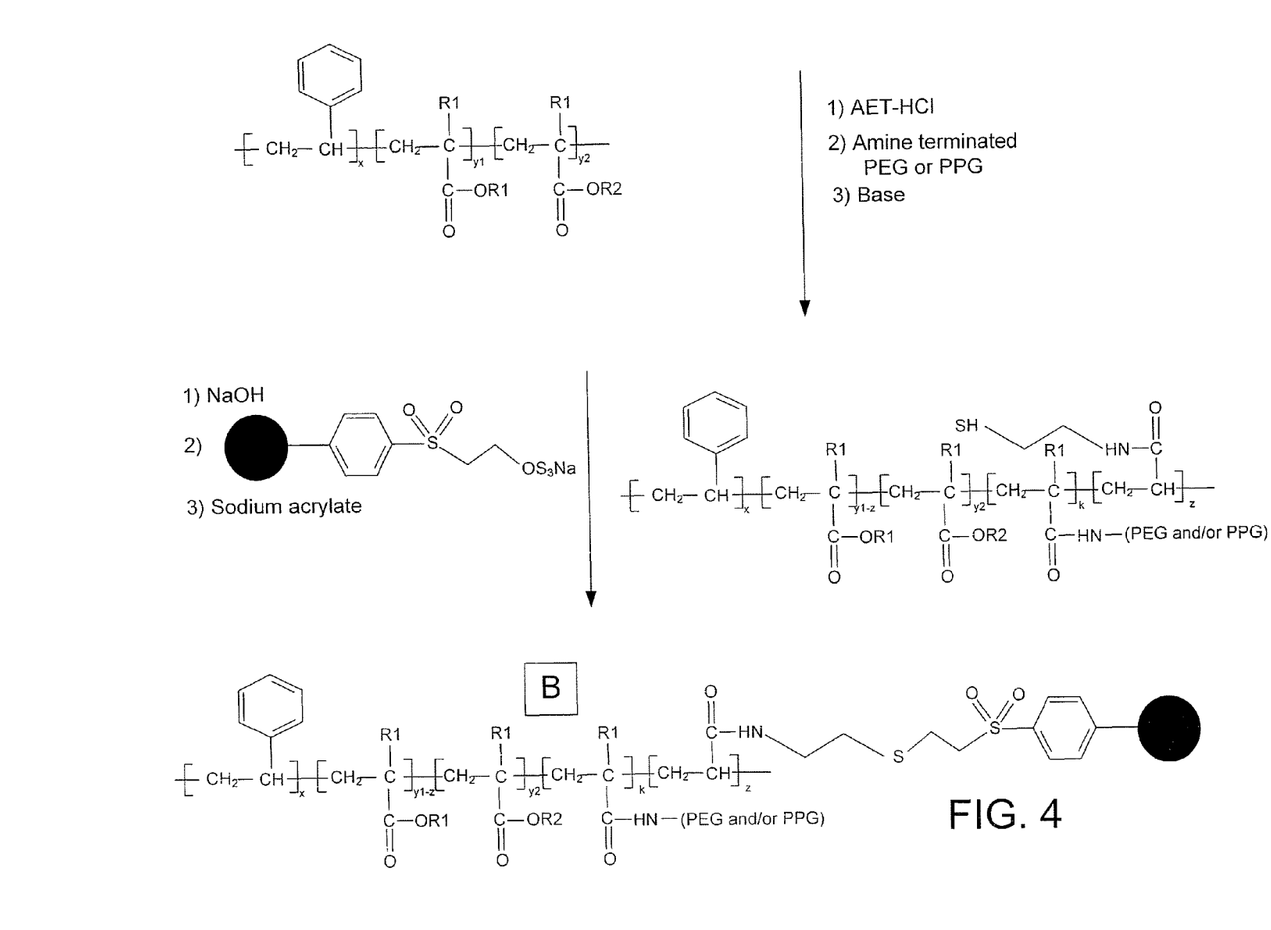
FIG. 4 illustrates another embodiment of a representative reaction mechanism to produce a modified pigment B.

Another exemplary ink composition, among others, includes a pigment B represented by the formula in FIG. 4, wherein R1 can be selected from the following: H and methyl, wherein R2 can be selected from the following: an alkyl group, wherein the value of x, y1, and y2 correspond to an acid number that is from about 3 to 500, wherein the value of x, y1, and y2 correspond to a glass transition temperature of about −30 to 120° C., wherein the value of k is about 0 to 100%, wherein the value of z is about 5 to 80% of the value of y1, wherein PEG is polyethylene glycol and PPG is polypropylene glycol, and wherein ● is a pigment.

Figure 5:
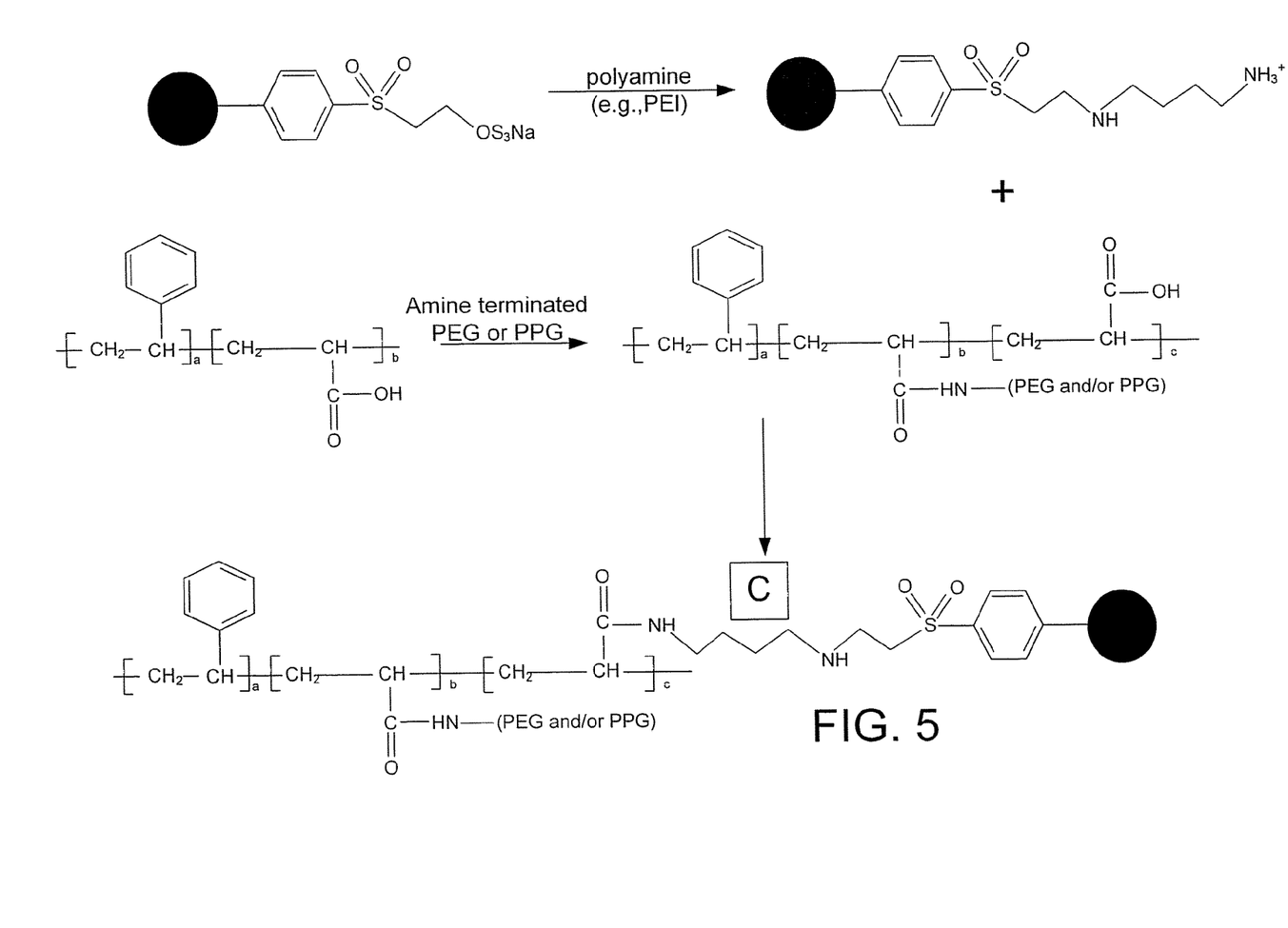
FIG. 5 illustrates another embodiment of a representative reaction mechanism to produce a modified pigment C.

Another exemplary ink composition, among others, includes a pigment C represented by the formula in FIG. 5, wherein the value of a, b, and c correspond to an acid number that is about 3 to 500, wherein the value of a, b, and c correspond to a glass transition temperature of about −30 to 120° C., wherein PEG is polyethylene glycol and PPG is polypropylene glycol, and wherein ● is a pigment.

Figure 6:
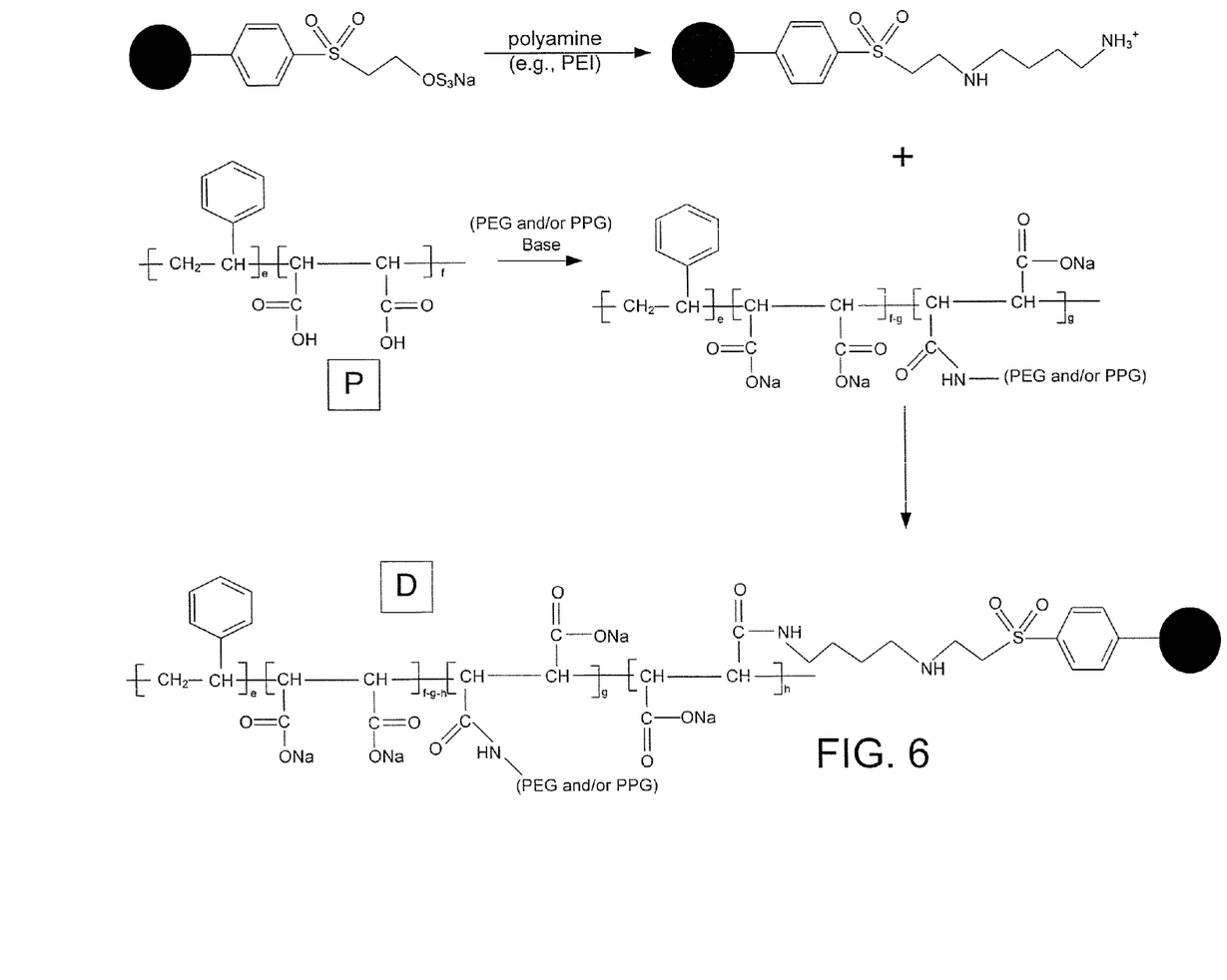
FIG. 6 illustrates another embodiment of a representative reaction mechanism to produce a modified pigment D.

Another exemplary ink composition, among others, includes a pigment D represented by the formula in FIG. 6, wherein the ratio of e to f is about 1:1, wherein the value of g is about 5 to 100% of the value of f, wherein the value of h is about 1 to 10, wherein PEG is polyethylene glycol and PPG is polypropylene glycol, and wherein ● is a pigment.

Figure 7:
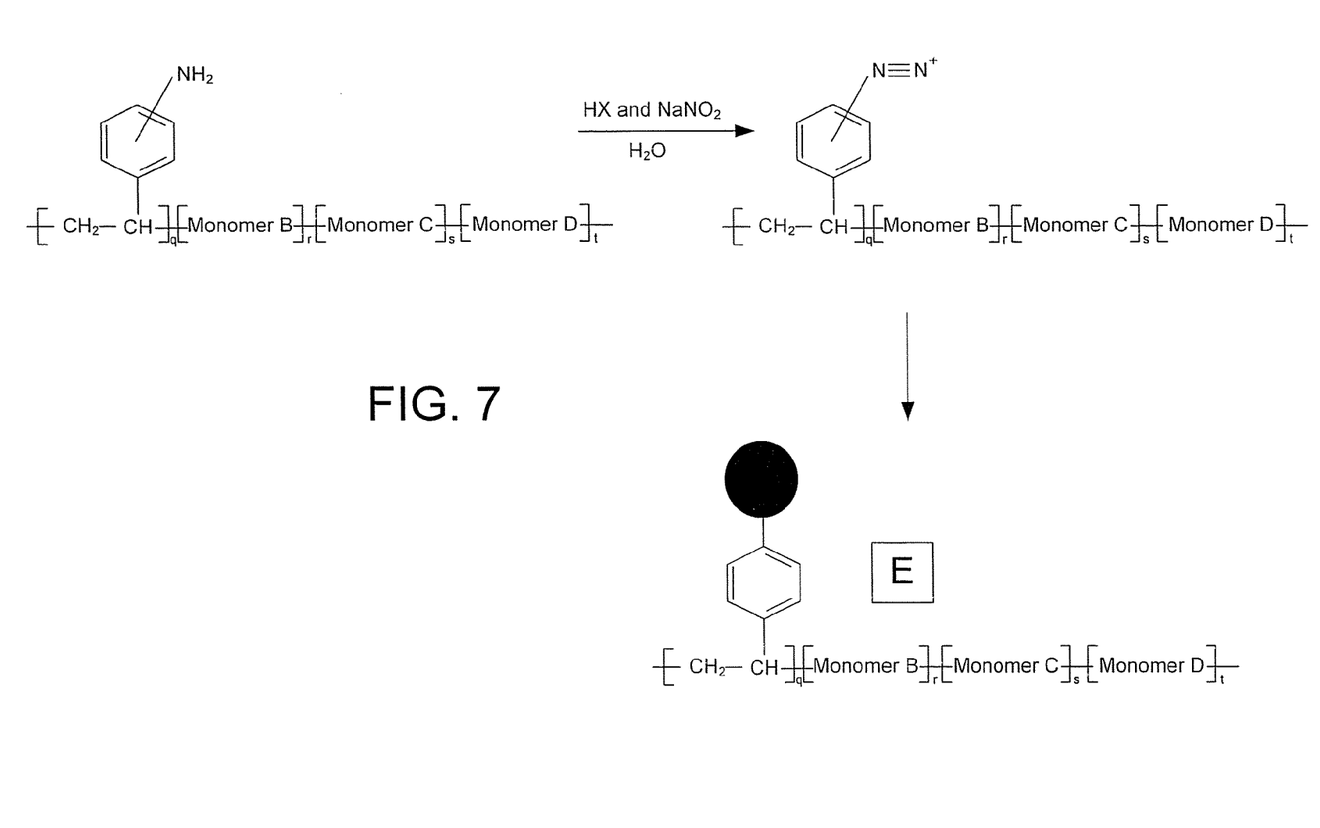
FIG. 7 illustrates another embodiment of a representative reaction mechanism to produce a modified pigment E.

Another exemplary ink composition, among others, includes a pigment E represented by the formula in FIG. 7, wherein the value of q is about 1 to 100, wherein the value of r is about 1 to 100 monomer units per chain, wherein the value of s is about 1 to 100 monomer units per chain, wherein the value of t is about 1 to 100 monomer units per chain, and wherein ● is a pigment.

BRIEF DESCRIPTION OF THE DRAWINGS

Many aspects of this disclosure can be better understood with reference to the following drawings. The components in the drawings are not necessarily to scale.

DETAILED DESCRIPTION

It has been fortuitously and unexpectedly discovered that novel ink compositions according to embodiments of the present disclosure advantageously exhibit desirable rheological properties. In addition, modified pigments, formulations, and methods of making modified pigments and formulations, are described. Exemplary embodiments of the disclosed modified pigments, when used in ink formulations, produce images of high gloss, uniform area fill, and/or good black/color mixing. Embodiments of the disclosed modified pigments have high stability, low viscosity, and compatibility with multiple solvent and paper types, as compared to other pigments.

Part A

Figure 1:
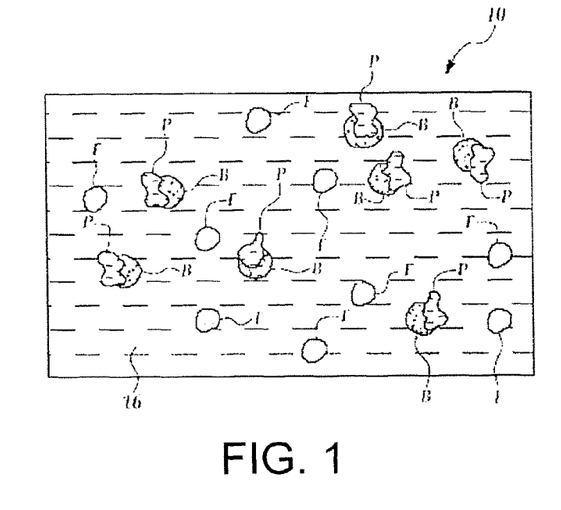
FIG. 1 is a schematic view of an embodiment of the ink composition of the present disclosure.

As shown in FIG. 1, embodiments of the ink composition 10 include both polymeric binders B attached to a pigment P and unattached/free polymeric binders F dispersed throughout a vehicle 16. It is contemplated that the viscosity of the ink composition 10 may be lowered when the attached polymeric binders B and free polymeric binders F are chemically similar. Without being bound to any theory, it is believed that this reduction in viscosity may be due in part to the addition of the chemically similar free polymeric binders F, which may substantially reduce electrostatic and/or electrosteric interactions between the attached binders B and the vehicle 16.

It is to be understood that the vehicle 16 is an aqueous vehicle in embodiments of the present disclosure. As used herein, "aqueous vehicle" refers to the vehicle 16 in which pigment/colorant P is placed to form an ink composition 10. Ink vehicles are known in the art, and a wide variety of ink vehicles may be used with embodiments of the compositions, systems and methods of the present disclosure. Such aqueous vehicles 16 may include solvents, including but not limited to glycols, amides, pyrrolidones, and/or the like, and/or mixtures thereof in amounts ranging between about 0.01 and 20 wt %; alternately, between about 0.01 and 7 wt %; or between about 0.01 and 4 wt %. Aqueous vehicles 16 may also optionally include one or more water-soluble surfactants/amphiphiles in amounts ranging between about 0 and 5 wt %; alternately, between about 0.1 and 2 wt %. The balance of the aqueous vehicle 16 is generally water in embodiments of the present disclosure.

In embodiments of the ink composition 10, one or more co-solvents may be added to the aqueous vehicle 16 in the formulation of the ink composition 10. Examples of suitable classes of co-solvents include, but are not limited to, aliphatic alcohols, aromatic alcohols, diols, caprolactams, lactones, formamides, acetamides, long chain alcohols, and mixtures thereof. Examples of suitable co-solvent compounds include, but are not limited to, primary aliphatic alcohols of 30 carbons or fewer, primary aromatic alcohols of 30 carbons or fewer, secondary aliphatic alcohols of 30 carbons or fewer, secondary aromatic alcohols of 30 carbons or fewer, 1,2-alcohols of 30 carbons or fewer, 1,3-alcohols of 30 carbons or fewer, 1,5-alcohols of 30 carbons or fewer, N-alkyl caprolactams, unsubstituted caprolactams, substituted formamides, unsubstituted formamides, substituted acetamides, unsubstituted acetamides, and mixtures thereof.

Some specific suitable examples of co-solvents include, but are not limited to 1,5-pentanediol, 2-pyrrolidone, 1,2-hexanediol, 2-ethyl-2-hydroxymethyl-1,3-propanediol, diethylene glycol, 3-methoxybutanol, 1,3-dimethyl-2-imidazolidinone, and mixtures thereof. The co-solvent concentration may range between about 0.01 wt. % and 50 wt. %. In an embodiment, the co-solvent concentration ranges between about 0.1 wt. % and 20 wt. %.

In embodiments of the ink composition 10 of the present disclosure wherein water-soluble surfactants are added to the aqueous vehicle, it is to be understood that these surfactants may be added as free components to the ink composition 10 and are not otherwise associated or intended to become part of the polymeric binders B/unattached binders F described herein. Non-limiting examples of suitable surfactants include fluorosurfactants, non-ionic surfactants, amphoteric surfactants, ionic surfactants, and/or mixtures thereof.

Examples of suitable surfactants include, but are not limited to the following commercially available tradenames: ZONYLs (fluorosurfactants), available from E.I. du Pont de Nemours and Co. located in Wilmington, Delaware and TERGITOLs (alkyl polyethylene oxides), available from Union Carbide in Piscataway, N.J.

Examples of amphiphiles/surfactants that may be used in embodiments of the present disclosure include, but are not limited to iso-hexadecyl ethylene oxide 20 and amine oxides, such as N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadec-enyl)-N-amine oxide, and mixtures thereof. The concentration of the amphiphiles/surfactants may range between about 0 wt. % and 5 wt. %. In an embodiment, the concentration of amphiphiles/surfactants ranges between about 0.1 wt. % and 2 wt. %.

It is to be understood that various types of additives may be employed in the ink composition 10 according to embodiments of the present disclosure to optimize the properties of the ink composition 10 for specific applications. For example, biocides may be used in an embodiment of the ink composition 10 to inhibit growth of microorganisms. One suitable non-limiting example of a biocide is commercially available under the tradename PROXEL GXL (a solution of 1,2-benzisothiazolin-3-one (BIT), sodium hydroxide, and dipropylene glycol) from Avecia Inc. located in Wilmington, Del. Sequestering agents such as EDTA may be included to substantially eliminate potential deleterious effects of heavy metal impurities (if any). Buffer solutions may be used to control the pH of the ink composition 10, as desired and/or necessitated by a particular end use.

The ink composition 10 according to embodiments of the present disclosure includes pigment P dispersed throughout the aqueous vehicle 16. It is to be understood that any suitable pigment P that is capable of having polymeric binders B attached thereto may be used. Some non-limiting examples of suitable pigments include those supplied by Cabot Corp. in Billerica, Mass. Non-limiting examples of some suitable polymer B attached pigments P are described in U.S. Pat. No. 6,432,194 assigned to Cabot Corporation and issued to Johnson et al. entitled "Method of attaching a group to a pigment," which patent is incorporated herein in its entirety.

The pigment P may have any suitable polymeric binders B attached thereto. The attached polymeric binders B may be selected using a variety of parameters including, but not limited to molecular weight, acid number and/or the type of monomers within the polymeric binders B. In one embodiment, the molecular weight of the attached polymeric binders B ranges between about 4,000 and about 20,000. In another embodiment, the acid number of the attached polymeric binders B may range between about 50 and about 300. Examples of suitable monomers within the polymeric binders B include, but are not limited to styrene, acrylic acid, substituted acrylic acids, maleic anhydride, and/or substituted maleic anhydrides. In addition, the pigment P can include pigments such as those described in more detail in PART B.

Some non-limiting examples of polymeric binders B capable of attaching to the pigment P are polyurethane resins, styrene-acrylic resins/polymers/copolymers, styrene-maleic anhydride resins/polymers/copolymers, styrene-acrylic resins/polymers/copolymers having ethylene and/or propylene glycol graphed thereto, styrene-maleic anhydride resins/polymers/copolymers having ethylene and/or propylene glycol graphed thereto, and combinations thereof. Styrene-acrylic resins/polymers/copolymers having ethylene and/or propylene glycol graphed thereto and styrene-maleic anhydride resins/polymers/copolymers having ethylene and/or propylene glycol graphed thereto, are discussed in more detail in PART B (e.g., FIGS. 1 and 2).

Some suitable polyurethane resins are commercially available from Avecia in Manchester, England. Some suitable styrene-acrylic resins/polymers are commercially available under the tradenames JONCRYL 586 (J586), JONCRYL 671 (J671) and JONCRYL 696 (J696) from Johnson Polymer, Inc. located in Sturtevant, Wis., and SMA (Styrene Maleic Anhydride) polymers available from Sartomer located in Exton, Pa.

In an embodiment, the pigment P having polymeric binders B attached thereto is present in an amount ranging between about 1 wt. % and 10 wt. % of the ink composition and about 0.5 to 2 wt. % of the ink composition. In an alternate embodiment, the pigment P having polymeric binders B attached thereto is present in an amount ranging between about 3 wt. % and 5 wt. % of the ink composition 10.

An embodiment of the ink composition 10 further includes at least one unattached/free polymeric binder F dispersed throughout the aqueous vehicle 16. It is to be understood that the unattached polymeric binders F may be substantially homogeneously and/or non-homogeneously mixed throughout the aqueous vehicle 16. In an embodiment, the unattached polymeric binders F are present in an amount ranging between about 0.1 wt. % and 6 wt. % of the ink composition. In an alternate embodiment, the unattached polymeric binders F are present in an amount ranging between about 1 wt. % and 3 wt. % of the ink composition 10.

In an embodiment of the ink composition 10 of the present disclosure, selected unattached polymeric binders F are formed from a polymeric material that is chemically similar to the selected attached polymeric binders B. "Chemically similar" as defined herein denotes compounds that have the same or similar molecular weight, acid number and/or monomer composition. It is to be understood that "similar" in regard to molecular weights as defined herein is contemplated to encompass compounds having molecular weights ranging between about 4000 and 18000.

Similar to the attached polymeric binders B, in an embodiment of the ink composition 10, the molecular weight of the unattached polymeric binders F ranges between about 4,000 and 20,000, and the acid number ranges between about 50 and 300. Non-limitative examples of suitable unattached polymeric binders F include the polyurethane resins and styrene-acrylic resins/polymers as previously described in reference to the attached polymeric binders B.

It is believed, without being bound to any theory, that when the unattached polymeric binders F and the attached polymeric binders B are chemically similar, the electrostatic and/or electrosteric interactions between the attached polymeric binders B and the aqueous vehicle 16 may be substantially reduced. This reduction may advantageously help to lower the viscosity of the ink composition 10. The viscosity of the ink composition 10 of the present disclosure ranges between about 2 cps and 10 cps. In an alternate embodiment, the viscosity of the ink composition 10 of the present disclosure ranges between about 2 cps and 6 cps. The reduced viscosity of the ink composition 10 may advantageously help to improve ink reliability, ink durability, and print quality.

Figure 2:
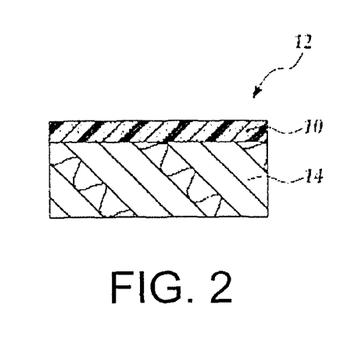
FIG. 2 is a schematic view of an embodiment of the ink composition disposed on a substrate.

FIG. 2 illustrates an embodiment of the ink composition 10 deposited on a substrate 14 to form a pigmented ink system 12. It is to be understood that the ink composition 10 may be deposited on the substrate 14 using any suitable printing technique, such as an ink jet printer. Examples of suitable substrate 14 materials include, but are not limited to cellulosic materials (e.g., paper materials), wood, textile materials, polymeric materials, metals and/or mixtures thereof.

In a method of making an embodiment of the ink composition 10, an amount of the pigment P having polymeric binders B attached thereto is admixed in a selected aqueous vehicle 16 to form an ink fluid. Further, at least one unattached polymeric binder F may be admixed with the ink fluid to form the ink composition 10. It is to be understood that the materials described above may be selected and that the attached polymeric binders B are substantially chemically similar to the unattached polymeric binders F.

To further illustrate the present disclosure, the following examples are given. It is to be understood that these examples are provided for illustrative purposes and are not to be construed as limiting the scope of the present disclosure.

PART A EXAMPLES

Table 1 of PART A illustrates various examples of the ink composition 10 according to embodiments of the present disclosure. The examples labeled A-J, list the ingredients used, the viscosity of the embodiment of the ink composition 10.

TABLE 1

| Ingredients - all wt % | A | B | C | D | E | F | G | H | I | J |
|---|---|---|---|---|---|---|---|---|---|---|
| Cabot Pigment J586 attached | 4 | 4 | 0 | 0 | 0 | 0 | 0 | 0 | 0 | 0 |
| Cabot Pigment J671 attached | 0 | 0 | 4 | 4 | 0 | 0 | 4 | 4 | 0 | 0 |
| Cabot Pigment J696 attached | 0 | 0 | 0 | 0 | 4 | 4 | 0 | 0 | 4 | 4 |
| Joncryl 586, AN 108, Mw 4600 | 0 | 2 | 0 | 0 | 0 | 0 | 2.5 | 0 | 2.5 | 0 |
| Joncryl 671, AN 214, Mw 17250 | 0 | 0 | 0 | 2 | 0 | 0 | 0 | 0 | 0 | 0 |
| Joncryl 696, AN 220, Mw 16000 | 0 | 0 | 0 | 0 | 0 | 2 | 0 | 0 | 0 | 0 |
| Fluorosurfactant | 0.2 | 0.2 | 0.2 | 0.2 | 0.2 | 0.2 | 0.2 | 0.2 | 0.2 | 0.2 |
| 2-Pyrrolidone | 7 | 7 | 7 | 7 | 7 | 7 | 7 | 7 | 7 | 7 |
| 1,2 Alkanediol | 4 | 4 | 4 | 4 | 4 | 4 | 4 | 4 | 4 | 4 |

TABLE 1-continued

| | Examples A-J | | | | | | | | | |
|---|---|---|---|---|---|---|---|---|---|---|
| Ingredients - all wt % | A | B | C | D | E | F | G | H | I | J |
| Proxel GXL | 0.2 | 0.2 | 0.2 | 0.2 | 0.2 | 0.2 | 0.2 | 0.2 | 0.2 | 0.2 |
| Water* | Bal | Bal | Bal | Bal | Bal | Bal | Bal | Bal | Bal | Bal |
| Viscosity | 2.09 | 2.44 | 10.45 | 6.3 | 13.12 | 6.68 | 6.74 | 7.31 | 9.84 | 10.53 |

*Water makes up the balance (Bal) of the vehicle

Comparing ink compositions C and D illustrates how the addition of unattached binders B may reduce the viscosity of the final ink composition 10. Example C contains CABOT PIGMENT with JONCRYL 671 attached thereto and no unattached binders in the aqueous vehicle 16. The viscosity of ink composition C was 10.45 cps. Example D contains the same composition as Example C with the addition of 2 wt. % unattached JONCRYL 671. The viscosity of Example D was lowered to 6.3 cps, making the ink composition 10 more desirable for printing.

Without being bound to any theory, it is believed that the slight rise in viscosity between ink composition A and ink composition B may be due to the following. In this case, both the attached polymeric binder B and free polymeric binder F have low molecular weights, and the pigment P-binder B interactions are less than the vehicle 16 binder B interactions. Therefore, the ink viscosity increases slightly because of the vehicle 16-binder B interaction. In other examples, the molecular weights of the polymers are higher; thus there is more pigment P-vehicle 16 interaction.

The ink compositions 10 according to embodiments of the present disclosure may offer many advantages, examples of which include, but are not limited to the following. The combination of the chemically similar attached polymeric binders B and unattached polymeric binders F may advantageously lower the viscosity of the ink composition 10. The lower viscosity may result in improved pen reliability, ink durability, and/or high print quality. Still further, the addition of unattached polymeric binders F that are chemically similar to the attached polymeric binders B may advantageously reduce the electrostatic and/or electrosteric interactions between the attached polymeric binders B and the aqueous vehicle 16.

Part B

In general, the modified pigment in FIG. 3 includes, but is not limited to, a styrene-maleic anhydride co-polymer having a polyethylene glycol (PEG) and/or polypropylene glycol (PPG) compound grafted thereon. The styrene-maleic anhydride co-polymer is attached covalently to a sulfatoethylsulfone-pigment via an amine-thio linkage (hereinafter "modified pigment A"). Typically, the PEG/PPG and the sulfatoethylsulfone-pigment are disposed on different monomers of maleic anhydride. The modified pigment A is substantially resistant to chemical attacks from acids, bases, and salts. In addition, the modified pigment A is miscible with various co-solvents due, at least in part, to the ethylene glycol and/or propylene glycol.

FIG. 3 illustrates an embodiment of a representative reaction mechanism to produce the modified pigment A. A styrene-maleic anhydride co-polymer is provided and then reacted with AET-HCl (AET=NH$_2$CH$_2$CH$_2$SH), and an amine terminated PEG and/or PPG with a base (e.g., triethylamine), where the components are in a solvent such as, but not limited to, dimethyl sulfide (DMS). Under typical reaction conditions, the pH is basic (e.g., above 10.5). The product of the reaction is the styrene-maleic anhydride co-polymer having an amine-thio linkage on a maleic anhydride monomer and an amine terminated PEG and/or PPG on a different maleic anhydride monomer. The monomers can be randomly arranged or block arranged.

The percentage of amine terminated PEG and PPG grafted onto the styrene-maleic anhydride co-polymer backbone can range from about 0.01 to 90%, about 0.01 to 50%, or from about 5 to 20% based on the anhydride groups.

Next, the product is reacted with NaOH, a sulfatoethylsulfone-pigment, and sodium acrylate to produce modified pigment A. Under typical reaction conditions, the pH is basic (e.g., above a pH of 10.5). The amount of the styrene-maleic anhydride co-polymer covalently bonded to the surface area of the sulfatoethylsulfone-pigment can range from about 0.01 to 50%, about 0.01 to 20%, or from about 5 to 15%.

The ratio of n to m can be about 1.1, about 2:1, about 3:1, and about 4:1. The value of o and p can each be from about 5 to 100%, about 5 to 50%, or about 5 to 10% of the value of m.

The molecular weight of the styrene-maleic anhydride co-polymer having PEG and/or PPG (e.g., PEG, PPG, and combinations thereof (e.g., co-polymers thereof)) grafted thereon can range from about 1000 to 100,000, about 1000 to 30,000, or about 1000 to 10,000.

The molecular weight of PEG can range from about 300 to 10,000 MW, about 300 to 5,000 MW, about 500 to 2,000 MW. The molecular weight of PPG can range from about 300 to 5,000 MW, about 300 to 2,000 MW, or about 300 to 1,000 MW. The molecular weight of the co-polymer of polyethylene glycol and polypropylene glycol can range from between about 300 to 10,000 MW, 300 to 5,000 MW, or from 300 to 2,000 MW.

In general, the modified pigment in FIG. 4 includes, but is not limited to, a styrene-acrylate co-polymer having a PEG and/or PPG grafted thereon, attached covalently to a sulfatoethylsulfone-pigment via an amine-thio linkage (hereinafter "modified pigment B"). Typically, the PEG/PPG and the sulfatoethylsulfone-pigment are associated with different monomers of the acrylic monomer. The modified pigment B is substantially resistant to chemical attacks from acids, bases, and salts. In addition, the modified pigment B is miscible with various co-solvents due, at least in part, to the ethylene glycol and/or propylene glycol.

FIG. 4 illustrates an embodiment of a representative reaction mechanism to produce the modified pigment B. A styrene-acrylic co-polymer is provided and then reacted with NH$_2$CH$_2$CH$_2$SH, HCl, and an amine terminated PEG and/or PPG. Under typical reaction conditions, pH is basic (e.g., above a pH of 10.5). R1 can be H or methyl. R2 can include an alkyl group. In particular, R2 can be H, methyl, ethyl, propyl, and butyl. The monomers can be randomly arranged or block arranged. The product of the reaction is the styrene-acrylic co-polymer having an amine-thio linkage on an acrylic monomer and an amine terminated PEG and/or PPG on a different acrylic monomer.

The percentage of amine terminated PEG and PPG grafted onto the styrene-acrylic co-polymer backbone can range from about 1 to 90%, about 1 to 50%, and from about 5 to 20% based on the reactive carboxylic acid groups. Next, the product is reacted with NaOH, a sulfatoethylsulfone-pigment, and sodium acrylate to produce modified pigment B. Under typical reaction conditions, pH is basic (e.g., above pH of 10.5). The amount of the styrene-acrylic co-polymer covalently bonded to the surface area of the sulfatoethylsulfone-pigment can range from about 0.01 to 50%, about 0.01 to 20%, and from about 5 to 15%.

The value of x, y1, and y2 in modified pigment B correspond to an acid number that is from about 3 to 500, about 3 to 400, about 3 to 300, about 3 to 250, about 3 to 200, about 10 to 500, about 10 to 400, about 10 to 300, about 10 to 250, about 10 to 200, about 25 to 500, about 25 to 400, about 25 to 300, about 25 to 250, about 25 to 200, about 50 to 500, about 50 to 400, about 50 to 300, about 50 to 250, and about 50 to 200. In addition, the value of x, y1, and y2 in modified pigment B correspond to a glass transition temperature of about −30 to 120° C., about −30 to 110° C., about −30 to 80° C., about −20 to 120° C., about −20 to 110° C., about −20 to 80° C., about −10 to 120° C., about −10 to 110° C., about −10 to 80° C., about 0 to 120° C., about 0 to 110° C., about 0 to 80° C., about 10 to 120° C., about 10 to 110° C., about 10 to 80° C., about 20 to 120° C., about 20 to 110° C., and about 20 to 80° C. The value of k in modified pigment B can be from about 0 to 100%, about 5 to 75%, about 5 to 50%, about 5 to 25%, or about 5 to 10% of the value of y1. The value of z in modified pigment B can be from about 5 to 80%, about 5 to 65%, about 5 to 50%, about 10 to 50%, and about 10 to 30% of the value of y1.

The molecular weight of the styrene-acrylic co-polymer having PEG and/or PPG grafted thereon can range from about 1000 to 100,000, about 1,000 to 20,000, about 2,000 to 15,000.

The molecular weight of PEG can range from about 300 to 10,000 MW, about 300 to 5,000 MW, about 500 to 2,000 MW. The molecular weight of PPG can range from about 300 to 5,000 MW, about 300 to 2,000 MW, about 300 to 1,000 MW. The molecular weight of the co-polymer of polyethylene glycol and polypropylene glycol can range from between about 300 to 10,000 MW, 300 to 5,000 MW, and from 300 to 2,000 MW.

In general, the modified pigment in FIG. 5 includes, but is not limited to, a styrene-acrylic co-polymer having a PEG and/or PPG grafted thereon, attached covalently to a sulfatoethylsulfone-pigment via an amine linkage (hereinafter "modified pigment C"). Typically, the PEG/PPG and the sulfatoethylsulfone-pigment are disposed on different monomers of acrylic monomer. The modified pigment C is substantially resistant to chemical attacks from acids, bases, and salts. In addition, the modified pigment C is miscible with various co-solvents due, at least in part, to the ethylene glycol and/or propylene glycol.

FIG. 5 illustrates an embodiment of a representative reaction mechanism to produce the modified pigment C. The sulfatoethylamine-pigment is provided and reacted with a polyamine (e.g., primary amine, secondary amine, and polyethyleneimine (PEI)) to produce an amine terminated sulfatoethylsulfone-pigment. The amine terminated sulfatoethylamine-pigment is reacted with a styrene-acrylic co-polymer having the PEG and/or the PPG grafted thereto to produce modified pigment C. The PEG/PPG and the sulfatoethylamine-pigment are disposed on different monomers of the acrylic monomer. The monomers can be randomly arranged or block arranged.

The styrene-acrylic co-polymer having the PEG and/or the PPG grafted thereto can be fabricated in a similar manner as described above in reference to FIGS. 3 and 4 and the accompanying text. The percentage of amine terminated PEG and PPG grafted onto the styrene-acrylic co-polymer backbone can range from about 0.01 to 90%, about 0.01 to 50%, and from about 5 to 20% based on the anhydride groups.

The amount of the styrene-acrylic co-polymer covalently bonded to the surface area of the amine terminated sulfatoethylamine-pigment can range from about 0.01 to 50%, about 0.01 to 20%, and from about 5 to 15%.

The value of a, b, and c in modified pigment C correspond to an acid number that is from about 3 to 500, about 3 to 400, about 3 to 300, about 3 to 250, about 3 to 200, about 10 to 500, about 10 to 400, about 10 to 300, about 10 to 250, about 10 to 200, about 25 to 500, about 25 to 400, about 25 to 300, about 25 to 250, about 25 to 200, about 50 to 500, about 50 to 400, about 50 to 300, about 50 to 250, and about 50 to 200. In addition, the value of a, b, and c in modified pigment C correspond to a glass transition temperature of about −30 to 120° C., about −30 to 110° C., about −30 to 80° C., about −20 to 120° C., about −20 to 110° C., about −20 to 80° C., about −10 to 120° C., about −10 to 110° C., about −10 to 80° C., about 0 to 120° C., about 0 to 110° C., about 0 to 80° C., about 10 to 120° C., about 10 to 110° C., about 10 to 80° C., about 20 to 120° C., about 20 to 110° C., and about 20 to 80° C.

The molecular weight of the styrene-acrylic co-polymer having PEG and/or PPG grafted thereon can range from about 1000 to 100,000, about 1,000 to 20,000, about 2,000 to 15,000.

The molecular weight of PEG can range from about 300 to 10,000 MW, about 300 to 5,000 MW, about 500 to 2,000 MW. The molecular weight of PPG can range from about 300 to 5,000 MW, about 300 to 2,000 MW, about 300 to 1,000 MW. The molecular weight of the co-polymer of polyethylene glycol and polypropylene glycol can range from between about 300 to 10,000 MW, 300 to 5,000 MW, and from 300 to 2,000 MW.

In general, the modified pigment in FIG. 6 includes, but is not limited to, a styrene-maleic anhydride co-polymer having a PEG and/or PPG grafted thereon, attached covalently to a sulfatoethylamine-pigment via an amine linkage (hereinafter "modified pigment D"). Typically, the PEG/PPG and the sulfatoethylamine-pigment are disposed on different monomers of maleic anhydride monomer. The modified pigment D is substantially resistant to chemical attacks from acids, bases, and salts. In addition, the modified pigment D is miscible with various co-solvents due, at least in part, to the ethylene glycol and/or propylene glycol.

FIG. 6 illustrates an embodiment of a representative reaction mechanism to produce the modified pigment D. The sulfatoethylamine-pigment is provided and reacted with polyamine (e.g., primary amine, secondary amine, and polyethyleneimine (PEI)) to produce an amine terminated sulfatoethylsulfone-pigment. The amine terminated sulfatoethylamine-pigment is reacted with a styrene-maleic anhydride co-polymer having the PEG and/or the PPG grafted thereto to produce modified pigment D. The PEG/PPG and the sulfatoethylamine-pigment are disposed on different monomers of the maleic anhydride monomer. The monomers can be randomly arranged or block arranged.

The styrene-maleic anhydride co-polymer having the PEG and/or the PPG grafted thereto can be fabricated by reacting structure P with an amine terminated PEG and/or PPG. The percentage of amine terminated PEG and PPG grafted onto the styrene-maleic anhydride co-polymer backbone can range from about 0.01 to 90%, about 0.01 to 50%, and from about 5 to 20% based on the anhydride groups.

The amount of the styrene-maleic anhydride co-polymer covalently bonded to the surface area of the amine terminated sulfatoethylamine-pigment can range from about 0.01 to 50%, about 0.01 to 20%, and from about 5 to 15%.

The ratio of e to f can be about 1:1, about 2:1, about 3:1, and about 4:1. The value of g is about 5 to 100%, about 5 to 75%, about 5 to 50%, or about 5 to 20% of the value of f. The value of h is about 1 to 10.

The molecular weight of the styrene-maleic anhydride co-polymer having PEG and/or PPG grafted thereon can range from about 1000 to 100,000, about 1000 to 30,000, about 1000 to 10,000.

The molecular weight of PEG can range from about 300 to 10,000 MW, about 300 to 5,000 MW, about 500 to 2,000 MW. The molecular weight of PPG can range from about 300 to 5,000 MW, about 300 to 2,000 MW, about 300 to 1,000 MW. The molecular weight of the co-polymer of polyethylene glycol and polypropylene glycol can range from between about 300 to 10,000 MW, 300 to 5,000 MW, and from 300 to 2,000 MW. In embodiments including both the PEG and PPG molecule, the ratio of PEG to PPG can be about 100:1, about 75:1, about 50:1, about 25:1, about 10:1, and about 1:1.

In general, the modified pigment in FIG. 7 includes, but is not limited to, a styrene co-polymer having the styrene monomer attached covalently to a pigment (hereinafter "modified pigment E"). In addition, the co-polymer includes, but is not limited to, monomer B, monomer C, and monomer D. Monomer B is a hydrophobic monomer, while monomer C is a hydrophilic monomer. The monomers can be randomly arranged or block arranged. It should be noted that prior to reaction, the styrene monomer is an amine styrene monomer, but the amine group is not present in the modified pigment E per the diazonium reaction described below.

In general, an amine-styrene co-polymer (including monomer B, monomer C, and monomer D) shown in FIG. 7 is reacted with HX (X can be Cl, nitrate, and methane-sulfonic), $NaNO_2$, and water. The product of the reaction is a styrene co-polymer having a diazonium cation attached to the styrene benzene ring. Subsequently, the styrene co-polymer having a diazonium cation is reacted with a pigment through a reaction involving the diazonium cation, and the pigment is covalently bonded to the pigment through the styrene benzene ring. Diazonium chemistry and reaction parameters are discussed in U.S. Pat. Nos. 6,723,783; 5,554,739; 5,922,118; 5,900,029; 5,895,522; 5,885,335; 5,851,280; 5,837,045; and 5,922,118, and U.S. patent applications 20030217672 and 20040007152, each of which are incorporated herein by reference.

The amount of the amine-styrene co-polymer covalently bonded to the surface area of the pigment can range from about 5 to 50%, about 5 to 25%, and from about 5 to 15%.

Monomer B can include hydrophobic monomers such as, but not limited to, 2-ethylhexyl methacrylate, 2-hydroxyethyl methacrylate, acrylonitrile, vinylidene chloride, methyl methacrylate, methyl acrylate, ethyl acrylate, butyl acrylate, glycidyl, methacrylate, glycidyl acrylate, lauryl methacrylate, dodecyl methacrylate, styrene, chloromethyl styrene, benzyl methacrylate, butadiene, acrylamide, alkyl vinyl ether, silylated butadienes, divinylbenzene, trimethylsilyl methacrylate, alkoxysilane containing vinyl, p-vinylphenol, 2-vinyl quinoline, m-nitrostyrene, 4-hydroxystyrene, p-halomethyl styrene, 4-acetoxy styrene, 4-tert-butoxycarbonyloxy styrene and combination thereof.

Monomer C can include hydrophilic monomers such as, but not limited to, 2-aminoethyl methacrylate hydrochloride, acrylic acid, methacrylic acid, p-styrene sulfonate, p-methyl amino styrene, vinyl alcohol, p-dimethylamino styrene, vinyl pyridine, 2-methyl-5-vinyl pyridine, maleic anhydride, phenyl maleic anhydride, vinyl amine, vinyl acetate, ethylene-glycol methacrylate, propylene-glycol methacrylate, ethylene-glycol dimethacrylate, propylene-glycol dimethacrylate, trimethylolpropane trimethacrylate, 2-sulfo-1-dimethylethyl acrylamide, 4-styrene sulfonate, 2-sulfoethyl methacrylate, 4-styrene carboxylic acid, N-vinyl pyrrolidone, 1-vinyl imidazole, vinyl benzoic acid, and combinations thereof.

Monomer D can include monomers such as, but not limited to, acrylate, acrylic acid, maleic anhydride, macro-mers, and combinations thereof.

The value of q can be from about 1 to 100, about 1 to 75, about 1 to 50, about 1 to 25, and about 1 to 10 monomer units per chain. The value of r can be from about 1 to 100, about 1 to 75, about 1 to 50, about 1 to 25, and about 1 to 10 monomer units per chain. The value of s can be from about 1 to 100, about 1 to 75, about 1 to 50, about 1 to 25, and about 1 to 10 monomer units per chain. The value of t can be from about 1 to 100, about 1 to 75, about 1 to 50, about 1 to 25, and about 1 to 10 monomer units per chain.

For each of the modified pigments (or the precursor thereof), the monomer including styrene can, in the alternative, include a substituted styrene. Examples of a substituted styrene include, but are not limited to, p-methyl styrene, p-t-butyl styrene, p-chlorostyrene, p-bromostyrene, o-chlorostyrene, o-bromostyrene, 1,3,5-trichlorostyrene, 1,3,5-tribromostyrene, o-fluorostyrene, p-fluorostyrene, pentafluorostyrene, p-hydroxystyrene, p-pentylstyrene, and the like.

For each of the modified pigments (or the precursor thereof), maleic anhydride can be substituted for another anhydride monomer, such as, but not limited to, succinic anhydride, and itaconic anhydride, in other embodiments.

The pigment can include, but is not limited to, black pigment-based inks and colored pigment-based inks. Colored pigment-based inks can include, but are not limited to, blue, brown, cyan, green, white, violet, magenta, red, orange, yellow, as well as mixtures thereof.

The following black pigments can be used in the practice of this disclosure; however, this listing is merely illustrative and not intended to limit the disclosure. The following black pigments are available from Cabot: Monarch™ 1400, Monarch™ 1300, Monarch™ 1100, Monarch™ 1000, Monarch™ 900, Monarch™ 880, Monarch™ 800, and Monarch™ 700, Cab-O-Jet™ 200, Cab-O-Jet™ 300, Black Pearls™ 2000, Black Pearls™ 1400, Black Pearls™ 1300, Black Pearls™ 1100, Black Pearls™ 1000, Black Pearls™ 900, Black Pearls™ 880, Black Pearls™ 800, Black Pearls™ 700; the following are available from Columbian: Raven 7000, Raven 5750, Raven 5250, Raven 5000, and Raven 3500; the following are available from Degussa: Color Black FW 200, Color Black FW 2, Color Black FW 2V, Color Black FW 1, Color Black FW 18, Color Black S 160, Color Black FW S 170, Special Black 6, Special Black 5, Special Black 4A, Special Black 4, Printex U, Printex 140U, Printex V, and Printex 140V Tipure™; and R-101 is available from DuPont.

The pigment may also be chosen from a wide range of conventional colored pigments. For the purposes of clarification only, and not for limitation, some exemplary colorants suitable for this purpose are set forth below. The color of the second ink formulation can include, but is not limited to, blue, black, brown, cyan, green, white, violet, magenta, red, orange, yellow, as well as mixtures thereof.

Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128, Pigment Yellow 138, and Yellow Pigment 155.

Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

Other examples of pigments include Hostafinet series such as Hostafine™ Yellow GR (Pigment 13), Hostafine™ Yellow (Pigment 83), Hostafine™ Red FRLL (Pigment Red 9), Hostafine™ Rubine F6B (Pigment 184), Hostafine™ Blue 2G (Pigment Blue 15:3), Hostafine™ Black T (Pigment Black 7), and Hostafine™ Black TS (Pigment Black 7), available from Hoechst Celanese Corporation, Normandy Magenta RD-2400 (Paul Uhlich), Paliogen Violet 5100 (BASF), Paliogen™ Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen™ Blue L6900, L7020 (BASF), Heliogen™ Blue D6840, D7080(BASF), Sudan Blue OS (BASF), PV Fast Blue B2GO1 (American Hoechst), Irgalite Blue BCA (Ciba-Geigy), Paliogen™ Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen™ Orange 3040 (BASF), Ortho Orange OR 2673 (Paul Uhlich), Paliogen™ Yellow 152, 1560 (BASF), Lithol Fast Yellow 0991K (BASF), Paliotol Yellow 1840 (BASF), Novoperm™ Yellow FG 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm™ Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen™ Red 3871K (BASF), Paliogen™ Red 3340 (BASF), and Lithol Fast Scarlet L4300 (BASF).

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

PART B EXAMPLES

Table 1 of PART B lists ink formulations incorporating embodiments of various modified pigments. Tables 2 and 3 of PART B compare performances of IQ attributes on various glossy media. As shown, the ink formulation including the PEG modified pigment delivers higher gloss and better media independence.

TABLE 1

Ink Formulations Having Modified Pigments (Ink A) vs. Their Traditional Counterparts (Ink B)

| | Ink ID | | | |
| --- | --- | --- | --- | --- |
| | Ink A Black | Ink B Black | Ink A Light Gray | Ink B Light Gray |
| Polyethylene glycols | 3 | 3 | 3 | 3 |
| 2-P | 6 | 6 | 6 | 6 |
| Glycerol | 5 | 5 | 5 | 5 |
| Aliphatic diols | 4 | 4 | 4 | 4 |
| Hydrocarbon surfactant | 0.75 | 0.75 | 0.75 | 0.75 |
| Neopentyl alcohol | 0.75 | 0.75 | 0.75 | 0.75 |
| Fluorosurfactant | 0.2 | 0.2 | 0.2 | 0.2 |
| Styrene-maleic anhydride co-polymer binder | 0.4 | 0.4 | 0.4 | 0.4 |
| Black Pigment (PB1100/SMA3K-PEG) | 2.00 | | 0.50 | |
| Black Pigment (PB1100/SMA3K) | | 2.00 | | 0.50 |
| DDI water | Balance | Balance | Balance | Balance | pH = 9.1 to 9.4 w/KOH for the vehicle and final inks.
Numbers are in % wt.
pH is about 9.1 to 9.4 with KOH for the vehicle and final inks
Numbers are in % weight

TABLE 2

Gloss of the Black Inks

| | 20 Degree Gloss with Epx. Media[1] | | 20 Degree Gloss with Pictorico[2] | | 60 Degree Gloss with Luster Paper[3] | |
| --- | --- | --- | --- | --- | --- | --- |
| Print Density (low to high) | Ink A Black | Ink B Black | Ink A Black | Ink B Black | Ink A Black | Ink B Black |
| Media (white) | 44 | 44 | 34 | 34 | 24 | 24 |
| Step 1 | 78 | 130 | 107 | 114 | 50 | 51 |
| Step 2 | 84 | 150 | 114 | 143 | 59 | 67 |
| Step 3 | 88 | 105 | 106 | 110 | 56 | 61 |
| Step 4 | 78 | 87 | 113 | 91 | 56 | 56 |
| Step 5 | 75 | 111 | 113 | 101 | 58 | 56 |
| Step 6 | 77 | 111 | 110 | 103 | 57 | 58 |
| Step 7 | 78 | 110 | 112 | 101 | 58 | 59 |
| Step 8 | 74 | 113 | 107 | 96 | 58 | 59 |
| Step 9 | 77 | 109 | 107 | 106 | 58 | 63 |
| Step 10 | 55 | 119 | 106 | 112 | 58 | 64 |
| Step 11 | 13 | 124 | 93 | 121 | 48 | 67 |
| Step 12 | 8 | 102 | 78 | 136 | 40 | 68 |
| Step 13 | 7 | 100 | 71 | 146 | 38 | 69 |
| Step 14 (full density) | 6 | 99 | 95 | 147 | 42 | 71 |
| Step 15 | 7 | 106 | 117 | 145 | 43 | 70 |
| Average Gloss | 53 | 107 | 99 | 113 | 50 | 60 |

[1] Exp. Media: porous silica photo paper, HP in house media.
[2] Pictorico: Pictorico Photo Gallery Glossy Paper by AGA chemicals, Inc and Olympus America, Inc.
[3] Luster Paper: Epson Premium Luster photo paper.

TABLE 3

Gloss of the Light Gray Inks

| Print Density (low to high) | 20 Degree Gloss with Epx. Media[1] | | 20 Degree Gloss with Pictorico[2] | | 60 Degree Gloss with Luster Paper[3] | |
|---|---|---|---|---|---|---|
| | Ink A Light Gray | Ink B Light Gray | Ink A Light Gray | Ink B Light Gray | Ink A Light Gray | Ink B Light Gray |
| Media (white) | 44 | 44 | 34 | 34 | 24 | 24 |
| Step 1 | 83 | 85 | 79 | 62 | 34 | 27 |
| Step 2 | 167 | 139 | 135 | 94 | 53 | 42 |
| Step 3 | 177 | 181 | 167 | 134 | 69 | 54 |
| Step 4 | 175 | 181 | 175 | 166 | 79 | 65 |
| Step 5 | 137 | 181 | 152 | 182 | 81 | 72 |
| Step 6 | 96 | 181 | 136 | 182 | 81 | 81 |
| Step 7 | 73 | 181 | 110 | 183 | 75 | 83 |
| Step 8 | 66 | 176 | 90 | 175 | 68 | 82 |
| Step 9 | 60 | 151 | 89 | 161 | 61 | 84 |
| Step 10 | 34 | 140 | 82 | 155 | 51 | 78 |
| Step 11 | 10 | 135 | 91 | 159 | 47 | 80 |
| Step 12 | 4 | 64 | 107 | 147 | 48 | 80 |
| Step 13 | 2 | 38 | 118 | 127 | 47 | 81 |
| Step 14 (full density) | 2 | 26 | 132 | 125 | 49 | 80 |
| Step 15 | 2 | 16 | 126 | 121 | 50 | 79 |
| Average Gloss | 71 | 120 | 114 | 138 | 57 | 68 |

[1]Exp. Media: porous silica photo paper, HP in house media.
[2]Pictorico: Pictorico Photo Gallery Glossy Paper by AGA chemicals, Inc and Olympus America, Inc.
[3]Luster Paper: Epson Premium Luster photo paper.

Figure 8:
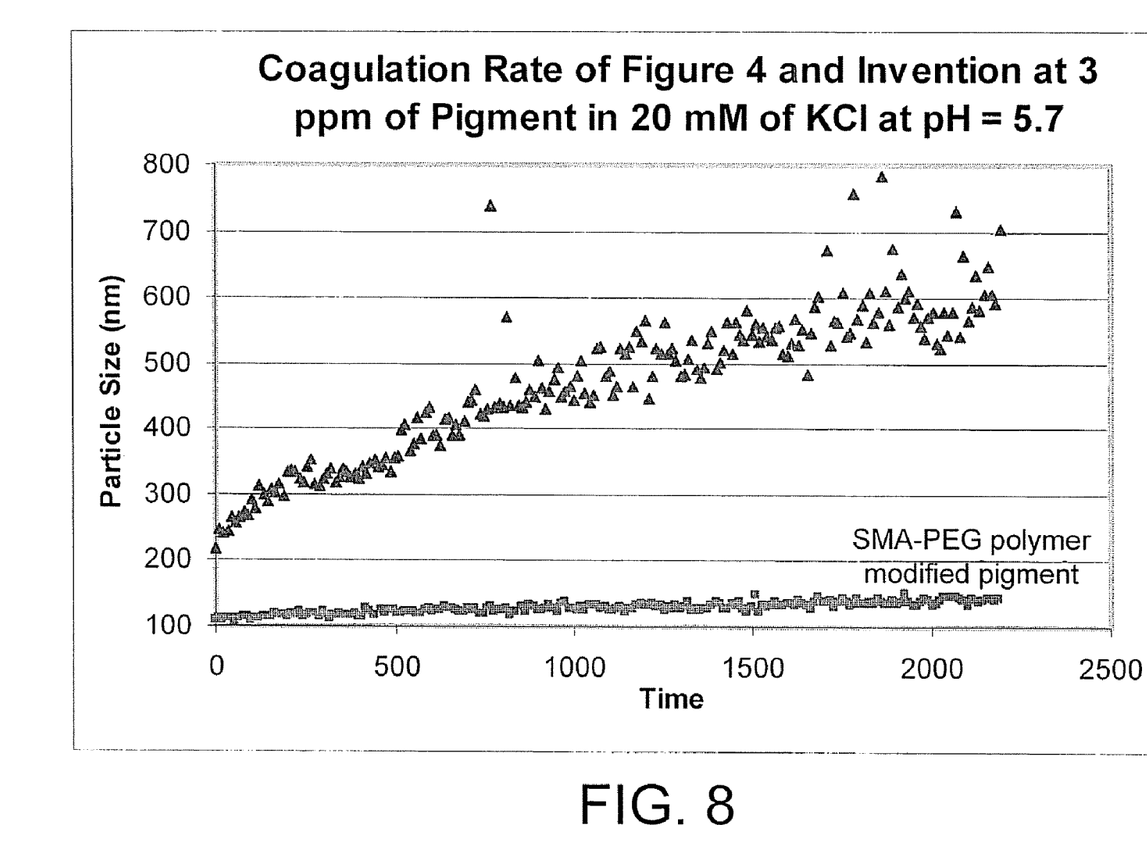
FIG. 8 is an illustrative graph illustrating a comparison of a standard chemically modified yellow pigment and a representative embodiment of modified pigment A.

FIG. 8 illustrates a graph comparing a yellow pigment chemically modified with traditional styrene-acrylic polymer (top curve, PY74 yellow pigment, and a yellow pigment chemically modified with SMA-Peg polymer (bottom curve) such as that illustrated in FIG. 3.

When the pigment was de-stabilized under various triggering conditions, such as ionic strength and pH, particles started to coagulate. The rate of coagulation was measured by monitoring the time evolution of the flocculation size as determined by dynamic light scattering (DLS). A characteristic coagulation time was derived from fitting the DLS data. The impact of trigger condition and surface modification type on the coagulation time was determined and provides critical insight as to how the pigment coagulation can be controlled to yield optimal print performance.

The bottom curve (SMA-PEG treated pigment) was more stable than the yellow pigment chemically modified with traditional styrene-acrylic polymer. The stability directly translates into better photo image quality. Photo paper typically triggers the flocculation of pigment dispersion by releasing salt or causing pH changes.

Yellow Pigment and Measurement Details

Both PY74 pigment dispersions were made into 100 ppm stock solutions. From the stock solution 30 uL was injected into 3 mL of 0.01 mol HCl solution in a 1 cm disposable plastic cuvet to yield a particle concentrations of 1 ppm. After thorough mixing, the cuvet was placed into the DSL instrument and measurement started within 5 seconds. DLS measurements were performed on a BIC ZetaPlus from Brookhaven Instrument Corp. which is equipped with a 30 mW, 670 nm solid state laser. Scattered light at 90° was collected by a single mode fiber optic. Autocorrelation was performed with BI-9000AT Digital Autocorrelator with a user selectable channels up to 512. During this study 200 channels were used with BI-PSDW software.

Synthesis Example for A Representative of Modified Pigment A in FIG. 3:

A solution was prepared by dissolving poly-styrene-co-maleic anhydride (SMA) (Available from Sartomer Company) in dry DMF. To this stirred solution, at room temperature, under a steady stream of nitrogen gas, was added amine terminated poly-ethylene oxide-co-propylene oxide (e.g., Jeffamine from Huntsman Corporation) and 2-aminoethanethiol hydrochloride as a solid in one portion and then triethylamine was added dropwise. The resultant mixture was heated at about 45° C. for about 30 minutes and then at room temperature for about 4.5 hours. The product was isolated by slowly dropping into vigorously stirred in HCl. After the addition, the mixture was stirred for another 60 minutes and then suction filtered, washed in HCl and then deionized water. The resulting product was briefly air dried to afford a free flowing white solid, which contained moisture. The moisture content could be measured by weight loss after heating at 110° C. for 1 hour.

The aminoethanethiolated-poly ethylene oxide-co-propylene oxide SMA polymer (SMA-PEG-thio) was dried at 110° C. Results from elemental combustion analysis could be used to characterize the modified polymers. Thiol was measured by titration with DTNB following a modification of Ellman's procedure (Ellman, G. L. (1958) Arch. Biochem. Biophys. 74, 443; Bioconjugate Techniques, Greg T. Hermanson, Academic Press, Inc., 1996, p 88).

The aqueous dispersion of Black Pearls® 1100 carbon black (available from Cabot Corporation) having attached a 2-(sulfatoethylsulfone) group was prepared according to the procedure described in PCT Publication No. WO 01/51566 to yield a pigment dispersion. This dispersion was added dropwise to the solution of the SMA-PEG-thiol polymer made above (dissolved with NaOH). An additional NaOH was added to raise pH to about 12-13. The resultant mixture was then stirred at about 40-50° C. for about 3.5 hours to give a dispersion of an embodiment of the modified pigment A.

A sodium acrylate solution was prepared by dissolving acrylic acid into DDI water containing about 11.7 of $Na_2CO_3$. This solution was added to the modified pigment dispersion to "cap" any unreacted thiol groups. Heating and stirring were continued for another 3 hours and the mixture was then allowed to cool to room temperature. The resultant dispersion was then purified by diafiltration to reach a final permeate polymer concentration of less than about 50 ppm.

Many variations and modifications may be made to the above-described embodiments. All such modifications and variations are intended to be included herein within the scope of this disclosure and protected by the following claims.

The invention claimed is:

1. An ink composition, comprising:
   an aqueous vehicle; and
   a modified pigment, the modified pigment comprising pigment E represented by the formula:

wherein the value of q is about 1 to 100, wherein the value of r is about 1 to 100 monomer units per chain, wherein the value of s is about 1 to 100 monomer units per chain, wherein the value of t is about 1 to 100 monomer units per chain, wherein ● is a pigment; and wherein Monomer B is selected from hydrophobic monomers, Monomer C is selected from hydrophilic monomers, and Monomer D is selected from the following: acrylate, acrylic acid, maleic anhydride, macro-mers, and combinations thereof.

2. The ink composition of claim 1 wherein Monomer B is selected from 2-ethylhexyl methacrylate, 2-hydroxyethyl methacrylate, acrylonitrile, vinylidene chloride, methyl methacrylate, methyl acrylate, ethyl acrylate, butyl acrylate, glycidyl, methacrylate, glycidyl acrylate, lauryl methacrylate, dodecyl methacrylate, styrene, chloromethyl styrene, benzyl methacrylate, butadiene, acrylamide, alkyl vinyl ether, silylated butadienes, divinylbenzene, trimethylsilyl methacrylate, alkoxysilane containing vinyl, p-vinylphenol, 2-vinyl quinoline, m-nitrostyrene, 4-hydroxystyrene, p-halomethyl styrene, 4-acetoxy styrene, 4-tert-butoxycarbonyloxy styrene, and combination thereof.

3. The ink composition of claim 1 wherein Monomer C is selected from 2-aminoethyl methacrylate hydrochloride, acrylic acid, methacrylic acid, p-styrene sulfonate, p-methyl amino styrene, vinyl alcohol, p-dimethylamino styrene, vinyl pyridine, 2-methyl-5-vinyl pyridine, maleic anhydride, phenyl maleic anhydride, vinyl amine, vinyl acetate, ethylene-glycol methacrylate, propylene-glycol methacrylate, ethylene-glycol dimethacrylate, propylene-glycol dimethacrylate, trimethylolpropane trimethacrylate, 2-sulfo-1-dimethylethyl acrylamide, 4-styrene sulfonate, 2-sulfoethyl methacrylate, 4-styrene carboxylic acid, N-vinyl pyrrolidone, 1-vinyl imidazole, vinyl benzoic acid, and combinations thereof.

4. An ink composition, comprising:
an aqueous vehicle;
a modified pigment dispersed throughout the aqueous vehicle, the modified pigment comprising pigment E represented by a first formula:

wherein the value of q is about 1 to 100, wherein the value of r is about 1 to 100 monomer units per chain, wherein the value of s is about 1 to 100 monomer units per chain, wherein the value of t is about 1 to 100 monomer units per chain, wherein ● is a pigment, and wherein Monomer B is selected from hydrophobic monomers, Monomer C is selected from hydrophilic monomers, and Monomer D is selected from the following: acrylate, acrylic acid, maleic anhydride, macro-mers, and combinations thereof; and
at least one unattached polymeric binder dispersed throughout the aqueous vehicle, the at least one unattached polymeric binder represented by a second formula:

wherein q, r, s, t, Monomer B, Monomer C, and Monomer D of the second formula are the same as q, r, s, t, Monomer B, Monomer C, and Monomer D of the first formula.

5. The ink composition of claim 4, wherein the modified pigment is present in an amount ranging between about 1 wt. % and about 10 wt. % of the ink composition.

6. The ink composition of claim 4, wherein the at least one unattached polymeric binder is present in an amount ranging between about 0.1 wt. % and about 6 wt. % of the ink composition.

7. An ink composition, comprising:
an aqueous vehicle;
a modified pigment dispersed throughout the aqueous vehicle, the modified pigment comprising pigment E represented by a first formula:

wherein the value of q is about 1 to 100, wherein the value of r is about 1 to 100 monomer units per chain, wherein the value of s is about 1 to 100 monomer units per chain, wherein the value of t is about 1 to 100 monomer units per chain, wherein ● is a pigment, wherein Monomer B is selected from hydrophobic monomers, Monomer C is selected from hydrophilic monomers, and Monomer D is selected from the following: acrylate, acrylic acid, maleic anhydride, macro-mers, and combinations thereof, and wherein the modified pigment is present in an amount ranging between about 3 wt. % and about 5 wt. % of the ink composition; and
at least one unattached polymeric binder dispersed throughout the aqueous vehicle, the at least one unattached polymeric binder represented by a second formula:

wherein q, r, s, t, Monomer B, Monomer C, and Monomer D of the second formula are the same as q, r, s, t, Monomer B, Monomer C, and Monomer D of the first formula, and wherein the at least one unattached binder is present in an amount ranging between about 1 wt. % and about 3 wt. % of the ink composition.

8. A method of making an ink composition, comprising the steps of:

admixing an amount of a modified pigment with an aqueous vehicle to form an ink fluid, the modified pigment comprising pigment E represented by a first formula:

wherein the value of q is about 1 to 100, wherein the value of r is about 1 to 100 monomer units per chain, wherein the value of s is about 1 to 100 monomer units per chain, wherein the value of t is about 1 to 100 monomer units per chain, wherein ● is a pigment, and wherein Monomer B is selected from hydrophobic monomers, Monomer C is selected from hydrophilic monomers, and Monomer D is selected from the following: acrylate, acrylic acid, maleic anhydride, macro-mers, and combinations thereof; and admixing an amount of unattached polymeric binders with the ink fluid to form the ink composition, the unattached polymeric binders represented by a second formula:

wherein q, r, s, t, Monomer B, Monomer C, and Monomer D of the second formula are the same as q, r, s, t, Monomer B, Monomer C, and Monomer D of the first formula.

9. The method of claim 8, wherein the amount of the modified pigment ranges between about 1 wt. % and about 10 wt. % of the ink composition.

10. The method of claim 8, wherein the amount of unattached polymeric binders ranges between about 0.1 wt. % and about 6 wt. % of the ink composition.

* * * * *